(No Model.)
E. TRAXLER.
POTATO DIGGER.
No. 363,098. Patented May 17, 1887.
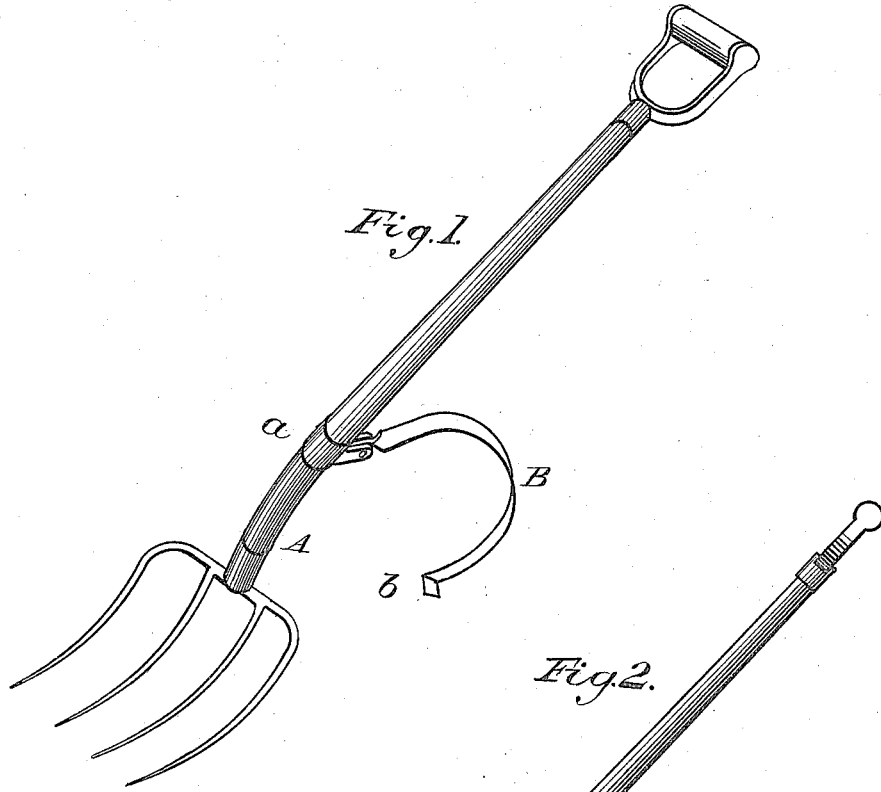
Witnesses:
D. W. Bush
Chas. O. Widener
Inventor:
Edward Traxler,
per R. F. Osgood,
Atty.

United States Patent Office.

EDWARD TRAXLER, OF DANSVILLE, NEW YORK.

POTATO-DIGGER.

SPECIFICATION forming part of Letters Patent No. 363,098, dated May 17, 1887.

Application filed January 15, 1887. Serial No. 224,502. (No model.)

*To all whom it may concern:*

Be it known that I, EDWARD TRAXLER, a citizen of the United States, residing at Dansville, in the county of Livingston and State of New York, have invented a certain new and useful Improvement in Potato-Diggers; and I do hereby declare that the following is a full, clear, and exact description of the same, reference being had to the drawings accompanying this application.

My improvement relates to that class of forks for digging potatoes in which a bar is attached to the handle and serves as the fulcrum for raising the fork when inserted under the potatoes.

The invention consists in the combination, with the fork, of a fulcrum-bar made in the form of a curved spring, with a foot at the bottom to hold in the soil, and a right-angled tang at the top to limit the motion of the fork in raising the same, as hereinafter more fully described.

In the drawings, Figure 1 is a perspective view of the device, and Fig. 2 is a side elevation of the same.

A indicates the fork, which is of usual form, and B is the bar that forms the fulcrum, the same being attached to the fork by means of a socket-piece, *a*, clamped to the handle by a bolt. The bar is of thin steel, forming a spring, and is of the curved form shown, the concave side being next to the fork-tines, whereby, when pressure is brought to bear on the bar in raising the fork under the potatoes, said bar will spring down more or less and will obviate the rigidity that occurs where a stiff bar is used. At the lower end of the spring is a right-angled foot, *b*, that sets into the soil and prevents slipping, and at the upper end is a right-angled tang or projection, *c*, that stands forward of the pivot and rests under the handle, and which strikes the handle and forms a stop to stiffen the handle and bar together in raising the fork under the potatoes and drawing it back, as is necessary in doing the work.

In the use of the device the fork is forced under the potatoes in the usual way in about the position shown in Fig. 2, the bar being drawn up, so as to serve as a fulcrum to the fork. In raising said fork it is bent over the fulcrum like a lever. In this action and in drawing back the fork the tang strikes against the handle, and the bar then acts as a stiff spring, giving elasticity to the fork in rising, and preventing the rigidity that occurs in the use of a stiff bar.

Having described my invention, what I claim as new, and desire to secure by Letters Patent, is—

The combination, with the fork, of the fulcrum-bar made in the form of a curved spring, with a foot at the bottom to hold in the soil, and with a right-angled tang at the top to strike the handle and stiffen the parts in raising and drawing back the fork, as herein shown and described.

In witness whereof I have hereunto signed my name in the presence of two subscribing witnesses.

EDWARD TRAXLER.

Witnesses:
L. KUHN,
WM. DRIESBACH.